US010742643B2

United States Patent
Moore

(10) Patent No.: US 10,742,643 B2
(45) Date of Patent: Aug. 11, 2020

(54) TRUSTED COMMUNICATION SESSION AND CONTENT DELIVERY

(71) Applicant: Comcast Cable Communications, LLC, Philadelphia, PA (US)

(72) Inventor: Jonathan Moore, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/216,623

(22) Filed: Dec. 11, 2018

(65) Prior Publication Data

US 2019/0281039 A1    Sep. 12, 2019

Related U.S. Application Data

(63) Continuation of application No. 15/687,231, filed on Aug. 25, 2017, now Pat. No. 10,187,382, which is a continuation of application No. 14/788,066, filed on Jun. 30, 2015, now Pat. No. 9,781,103, which is a continuation of application No. 14/079,987, filed on Nov. 14, 2013, now Pat. No. 9,106,620.

(51) Int. Cl.
*H04L 29/06* (2006.01)
*H04L 9/32* (2006.01)
*H04L 29/08* (2006.01)

(52) U.S. Cl.
CPC .......... *H04L 63/083* (2013.01); *H04L 9/3263* (2013.01); *H04L 63/0281* (2013.01); *H04L 63/062* (2013.01); *H04L 63/0823* (2013.01); *H04L 63/205* (2013.01); *H04L 67/28* (2013.01); *H04L 2209/24* (2013.01); *H04L 2209/64* (2013.01)

(58) Field of Classification Search
CPC . H04L 63/083; H04L 63/0823; H04L 63/205; H04L 63/0281; H04L 9/3263; H04L 63/062; H04L 2209/24; H04L 2209/64; H04L 67/28
See application file for complete search history.

(56) References Cited

U.S. PATENT DOCUMENTS

| | | | |
|---|---|---|---|
| 7,954,144 B1 | 5/2011 | Ebrahimi et al. | |
| 8,566,578 B1 * | 10/2013 | Banerjee | H04L 9/088 709/217 |
| 8,613,070 B1 * | 12/2013 | Borzycki | G06F 21/6218 726/8 |
| 8,640,229 B1 | 1/2014 | Riegel et al. | |

(Continued)

FOREIGN PATENT DOCUMENTS

| CA | 2871188 A1 | 5/2015 |
|---|---|---|
| EP | 2874369 A1 | 5/2015 |

OTHER PUBLICATIONS

European Search Report dated Apr. 20, 2015 by the International Searching Authority for International Application No. 14193243.4, filed on Nov. 14, 2014 and published as EP 2874369 on May 20, 2015 (Applicant—Comcast Cable Communications, LLC) (Pages).

*Primary Examiner* — Matthew Smithers
(74) *Attorney, Agent, or Firm* — Ballard Spahr LLP

(57) ABSTRACT

Methods and systems for network communication are disclosed. Proxy information may be received. The proxy information may facilitate a gateway device communicating as a proxy for a user device.

20 Claims, 7 Drawing Sheets

(56) References Cited

U.S. PATENT DOCUMENTS

| | | |
|---|---|---|
| 8,910,295 B2 | 12/2014 | Moore |
| 9,106,620 B2 * | 8/2015 | Moore .................. H04L 9/3263 |
| 9,154,488 B2 * | 10/2015 | Innes ...................... H04L 63/08 |
| 9,306,920 B2 | 4/2016 | Moore |
| 9,781,103 B2 * | 10/2017 | Moore .................. H04L 9/3263 |
| 10,187,382 B2 * | 1/2019 | Moore .................. H04L 9/3263 |
| 2003/0065777 A1 | 4/2003 | Mattila et al. |
| 2003/0163569 A1 | 8/2003 | Panasyuk et al. |
| 2003/0196084 A1 | 10/2003 | Okereke et al. |
| 2005/0120214 A1 | 6/2005 | Yeates et al. |
| 2006/0080546 A1 | 4/2006 | Brannon et al. |
| 2009/0113203 A1 * | 4/2009 | Tsuge ................ H04L 29/12377 713/151 |
| 2009/0138947 A1 | 5/2009 | Schneider et al. |
| 2013/0080574 A1 * | 3/2013 | Prince ................ H04L 61/6013 709/217 |
| 2013/0252583 A1 | 9/2013 | Brown et al. |
| 2013/0318343 A1 | 11/2013 | Bjarnason et al. |
| 2014/0101722 A1 | 4/2014 | Moore |
| 2014/0222900 A1 * | 8/2014 | Todd ................... H04L 67/2842 709/203 |
| 2014/0281918 A1 * | 9/2014 | Wei ........................ H04L 67/02 715/234 |
| 2014/0282986 A1 | 9/2014 | Leung et al. |
| 2015/0082410 A1 | 3/2015 | Fitzgerald et al. |
| 2015/0134967 A1 | 5/2015 | Moore |
| 2016/0036804 A1 | 2/2016 | Moore |
| 2018/0198772 A1 | 7/2018 | Moore |

\* cited by examiner

TRUSTED COMMUNICATION SESSION AND CONTENT DELIVERY

CROSS REFERENCE TO RELATED PATENT APPLICATION

This application is a continuation of U.S. application Ser. No. 15/687,231 filed Aug. 25, 2017, which is a continuation of U.S. application Ser. No. 14/788,066 filed Jun. 30, 2015 and issued as U.S. Pat. No. 9,781,103, which is a continuation of U.S. application Ser. No. 14/079,987 filed Nov. 14, 2013 and issued as U.S. Pat. No. 9,106,620, which are herein incorporated by reference in their entireties.

BACKGROUND

Service providers can provide content to users from a variety of content providers. Service providers may provide the content to users according to a variety of restrictions. Restrictions can be based on agreements with content providers or based on policies internal to the service provider. Providing content based on these restrictions presents various technical problems. Thus, there is a need for more sophisticated methods and systems for providing content based on restrictions.

SUMMARY

It is to be understood that both the following general description and the following detailed description are exemplary and explanatory only and are not restrictive, as claimed. Provided are methods and systems for configuring a network. In one aspect, an example method can comprise receiving a first token and an encryption key from a first device. A second token can be received from a second device. A determination can be made as to whether the first token matches the second token. Configuration information can be provided to the second device if the second token matches the first token. The configuration information can comprise information for connecting to a proxy configured on the first device. A request for content can be received from the proxy on behalf of the second device. The request for content can comprise the encryption key.

In another aspect, an example method can comprise establishing a communication session with a first device based on user information provided by and/or provided to the first device (e.g., by a user). A first token and a request for a signed security certificate can be received from a second device. The request for the signed security certificate can comprise an encryption key. A second token can be received from the first device based on the communication session. A determination can be made as to whether the second token matches the first token. The encryption key can be associated with the first device if the second token matches the first token. Configuration information can be provided to the first device for connecting to a proxy on the second device. A request for content can be received from the proxy based on the encryption key.

In another aspect, an example method can comprise providing a first token and an encryption key to a first device. A signed security certificate based on the encryption key can be received from the first device. A second token can be provided to a user. A request to connect to a proxy can be received from a second device based on the second token matching the first token. A proxy service can be provided to the second device based on the signed security certificate.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
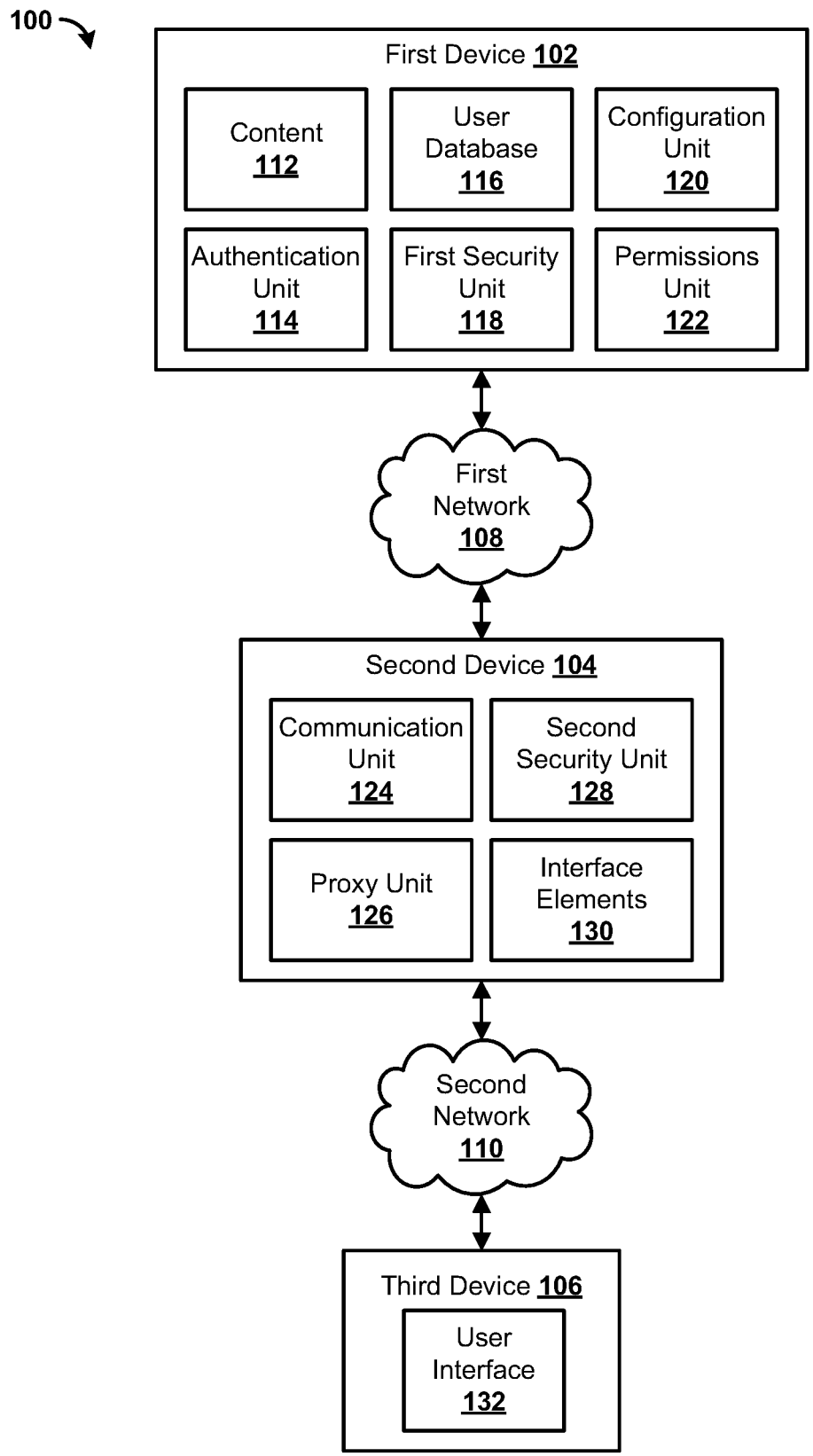
FIG. 1 is a block diagram illustrating an example system for providing content.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to configuring one or more networks for delivery of content. In one aspect, the content can be associated with restrictions. For example, a restriction can comprise a limitation on a geographic location where the content can be received. For example, the restriction may prevent the user from receiving content outside of a customer premises (e.g., or outside of a range of a user location). For example, a user can be restricted from accessing content outside of a home location. In one aspect, a user device can communicate with a content provider through an intermediary device. The intermediary device can be configured to function as both a gateway and as a proxy. The intermediary device can be located at the customer premises or other known location. In one aspect, the user device can enter into an authenticated communication session with the content provider. Then the intermediary device can generate a token (e.g., any arbitrary sequence of numbers, characters, letters, and/or symbols). The intermediary device can provide a copy of the token to the content provider along with a certificate signing request to enable encryption. Upon receiving a signed certificate from the content provider, the intermediary device can provide a copy of the token to the user device or the user (e.g., who can provide the token to the user device).

The user device can provide the token to the content provider. If the token received from the user device matches the token received from the intermediary device, the content provider can provide to the user device a host name identifying the proxy configured on the intermediary device. The user device can then send requests for content through the proxy to the content provider. The content provider can provide the content to the proxy configured on the intermediary device. Since the intermediary device is at a known location (e.g., whether presumed or actual), the content provider can provide the content through the proxy to allow a user to access content according to location restrictions. Furthermore, the content provider can deny requests for the content that do not pass through the proxy, thereby preventing access to content at unknown locations.

FIG. 1 is a block diagram illustrating an example system 100 for providing content. Those skilled in the art will appreciate that present methods may be used in systems that employ both digital and analog equipment. One skilled in the art will appreciate that provided herein is a functional description and that the respective functions can be performed by software, hardware, or a combination of software and hardware. In one aspect, the system 100 can comprise a first device 102, a second device 104, and a third device 106. The first device 102 can be communicatively coupled to the second device 104 through a first network 108. The second device 104 can be communicatively coupled to the third device 106 through a second network 110. Additionally, the first device 102 can be communicatively coupled to the third device 106 through the first network 108, the second device 104, and the second network 110.

In one aspect, the first network 108 and/or the second network 110 can comprise a packet switched network (e.g., internet protocol based network), a non-packet switched network (e.g., quadrature amplitude modulation based network), and/or the like. The first network 108 and second network 110 can comprise one or more wide area networks and/or local area networks. As an example, the first network 108 can comprise a wide area network, such as the Internet. The second network 110 can comprise a local area network, such as a home network located at a user premises. The first network 108 and/or the second network 110 can comprise network adapters, switches, routers, and the like connected through wireless links (e.g., radio frequency, satellite) and/or physical links (e.g., fiber optic cable, coaxial cable, Ethernet cable). In one aspect, the first network 108 and/or the second network 110 can be configured to provide communication from telephone, cellular, modem, and/or other electronic devices to and throughout the system 100.

In one aspect, the first device 102 can be configured to provide content 112 to devices, such as the second device 104 and/or the third device 106. For example, the first device 102 can be configured to receive requests for content from the second device 104 and/or the third device 106. The content 112 can comprise text, images, audio, video, interactive media, and the like. For example, the content 112 can comprise streaming media, such as streaming audio, streaming video, and the like. The content 112 can be provided by the first device 102 as content streams, as individual assets, and the like. The content 112 can be provided based one or more criteria as described in further detail herein. For example, the content 112 can be provided based on user information, an authenticated communication session, expiration criteria, matching criteria (e.g., matching tokens), and the like.

In one aspect, the first device 102 can comprise an authentication unit 114 configured to authenticate a user and/or a device. For example, the authentication unit 114 can be configured to establish a communication session between the first device 102 and the third device 106. In one aspect, the first device 102 can provide content 112 based on the communication session. In another aspect, the communication session can be an authenticated communication session. For example, the communication session can be based on user information received from the third device 106. User information can comprise, for example, a user name and a password. The authentication unit 114 can verify that the user information matches user information in a user database 116. For example, the user database 116 can comprise a plurality of data entries associated with users. In the user database 116, one or more users can be associated with one or more user names, passwords, identifiers, account information (e.g., name, payment information, user device identifiers, address information, subscription plans), user preferences, and the like. In one aspect, the communication session can be based on a secure communication protocol (e.g., a protocol that uses encryption), such as Hypertext Transfer Protocol Secure (HTTPS). For example, the first device 102 can provide a HTTPS cookie to the authenticated device. As another example, the first device 102 can provide credentials (e.g. username and password) over an encrypted channel. An example encrypted channel can be an HTTPS based connection with Basic or Digest Authentication. As another example, the first device 102 can provide a client certificate during an SSL handshake to provide an encrypted, mutually-authenticated HTTPS channel. As yet another example, the first device 102 can provide a digital signature, such as a signature based on OAuth protocol or other authentication protocol.

In one aspect, the first device 102 can comprise a first security unit 118. The first security unit 118 can be configured to enable trusted relationships between the first device 102 and one or more devices on the first network 108 and/or the second network 110. For example, the first security unit 118 can be configured to enable an encrypted communication session between the first device 102 and the second device 104 and/or third device 106. The first device 102 can receive a request for a signed security certificate (e.g., a certificate signing request). The request for the signed security certificate can comprise an encryption key, such as a public encryption key. The request for a signed security certificate can comprise a host name of a proxy. In another aspect, the request for a signed security certificate can be provided with other information (e.g., provided at the same time or in succession), such as a host name of a proxy. For example, the host name can identify the proxy provided by the proxy unit 126 of the second device 104. In one aspect, the first security unit 118 can process the request for the signed security certificate. For example, the first security unit 118 can generate a signed security certificate. The signed security certificate can comprise information, such as a certificate identifier, an encryption algorithm identifier, time values (e.g., origination date, expiration date), a device identifier, a host name or common name, an organization name, an issuer identifier, a user identifier, one or more digital signatures, and the like. After generating the signed security certificate, the first security unit 118 can return the signed security certificate to the device that provided the request for the signed security certificate. Additionally, the first security unit 118 can associate information (e.g., encryption key) from the request for the signed security certificate with a user and/or a device providing the request for a signed certificate. As another example, the first security unit 118 can associate the encryption key with the host name of the proxy.

In one aspect, the first security unit 118 can also be configured to receive one or more tokens from the second device 104 and/or the third device 106. A token can comprise a set of numbers, letters, symbols, a combination thereof, and the like. For example, the token can comprise any random or arbitrary set of numbers, letters, symbols, and the like. The first security unit 118 can be configured to associate one or more devices and/or users with another device based on a token. For example, the first device 102 can receive a first token from the second device 104. The first device 102 can receive a second token from the third device 106. The first security unit 118 can be configured to compare the first token and the second token. For example, the first security unit 118 can be configured to compare a set of numbers, letters, symbols, and/or the like of the first token to a set of numbers, letters, symbols, and/or the like of the second token. If the first token matches (e.g., has a threshold amount of equivalency, or satisfies an equality operation) the second token, then the first security unit 118 can associate the second device 104 and the third device 106.

In one aspect, the first security unit 118 can be configured to determine an expiration time for the first token and/or the second token. For example, an expiration time associated with the first token and/or the second token can be received by the first device 102 from the second device 104 and/or the third device 106. As a further example, the expiration time can comprise an expiration time of the security certificate. As another example, the expiration time can be based on a time the first token and/or the second token was received at the first device 102. For example, if the first token and/or the second token was received more than a specified amount of time in the past, then the first security unit 118 can determine that the first token and/or the second token is expired. As yet another example, the first token and/or the second token can comprise the expiration time. As an illustration, a specified set of numbers, characters, symbols, or the like in the token can indicate an expiration time. For example, the last X (e.g., where X is a specified number of character) number of characters of the token can comprise an expiration time.

In one aspect, the first security unit 118 can compare the expiration time to a current time. If the current time is determined to be after the expiration time, the first security unit 118 can determine that the first token and/or the second token are expired. If the first token and/or the second token are determined to be expired, the first security unit 118 can deem the match of the first token and the second token to fail or otherwise indicate that the first token and/or the second token are expired. In another aspect, the first security unit 118 can determine that the first token and/or the second token are expired based on other criteria. For example, the first token and/or the second token can be deemed to be expired if data in the first token and/or the second token is corrupted, the token fails specified criteria (e.g., the token is not from the expected device), and/or the like.

In one aspect, the first security unit 118 can be configured to associate a token with an encryption key. For example, the first security unit 118 can associate a token received from a device with an encryption key received from the same device. As an illustration, the first device 102 can associate the first token received from the second device 104 with an encryption key received from the second device 104. In one aspect, the first security unit 118 can be configured to associate a user of the third device 106 with an encryption key based on the first token and the second token matching. For example, if the first token and the second token match, then the first security unit 118 can associate the second token with the encryption key associated with the first token. As an illustration, the second token can be received from the third device 106 as part of a communication session. The communication session can be associated with a user. Accordingly, the security unit 118 can associate the encryption key (e.g., based on the match) with the communication session and/or the user associated with the communication session.

In one aspect, the first device 102 can comprise a configuration unit 120 configured to provide configuration information. For example, the configuration unit 120 can provide configuration information based on a matching of the first token and the second token. The configuration information can comprise, for example, the host name of a proxy (e.g., proxy server), the routing address of the proxy, the media access control address of the proxy, encryption information, proxy settings, and/or the like. The first device 102 can provide the configuration information to the second device 104 and/or the third device 106.

In one aspect, the first device 102 can comprise a permissions unit 122. The permissions unit 122 can manage permissions and other criteria associated with providing content 112. For example, the permissions unit 122 can indicate that some content can only be provided to a requesting device if additional criteria are satisfied. For example, content 112 can be associated with geographic restrictions. For example, in some scenarios, content 112 can be restricted to consumption at a user premises, such as a home location. In order to ensure that a user is receiving content at a specified location, the content 112 can be associated with a particular device. As a further example, the content 112 can be associated with a proxy at the device. As an illustration, the permissions unit 122 can specify that the content 112 can be accessed through the device and/or through the proxy at the device. In one aspect, the permissions unit 122 can be configured to verify that the requesting device and/or associated user account using the device satisfies the criteria associated with the content 112. If the criteria are satisfied, the permissions unit 122 can allow the device to receive the requested content 112.

As previously noted, the system 100 can comprise a second device 104. The second device 104 can be configured to request and receive content 112 from the first device 102. The second device 104 can be communicatively coupled to the first device through the first network 108. The second device 104 can be communicatively coupled to a third device 108 through a second network 110. The second device 104 can be configured to facilitate communication between the first device 102 and the third device 106. For example, the second device 104 can comprise a communication unit 124. In one aspect, the communication unit 124 can configure the second device 104 as a network router, a network switch, a network gateway, or other similar device. For example, the communication unit 124 can be configured to receive network packets from the third device 106 and route the packets to the first device 102. As an illustration, the third device 106 can transmit user information (e.g., with a request for a communication session) to the second device 104. The second device 104 can determine, based on a network protocol, that the user information is configured to be routed to the first device 102. Accordingly, the communication unit 124 can be configured to identify the destination. Then, the second device 104 can provide the user information to the destination (e.g., the first device 102). The communication unit 124 can be configured to route any kind of information in a network packet to any device accessible through the first network 108, the second network 110, or other network communicatively coupled to the second device 104.

In one aspect, the second device 104 can comprise a proxy unit 126 configured to provide one or more proxy services, such as a proxy server. For example, the proxy unit 126 can be configured to function as an intermediary between a requesting device and a receiving device. As a further example, the proxy unit 126 can be configured to modify network packets to prevent the receiving device from discovering the identity of the transmitting device based on the network packet. As another example, the proxy unit 126 can be configured to modify a network packet such that the packet's origination address is associated with the second device 104 rather than the device from which the network packet was received by the second device 104. The proxy unit 126 can be associated with a host name. For example, the host name can be a network address or name associated with a network address (e.g., through a local or remote naming server). In one aspect, the proxy unit 126 can operate a proxy server associated with the host name. For example, the host name can be used to direct a network packet to the proxy server configured on the second device 104.

In one aspect, the second device 104 can comprise a second security unit 128. The second security unit 128 can be configured to initialize a security communication channel between one or more other devices. For example, the second security unit 128 can be configured to determine (e.g., identify, generate, locate) one or more encryption keys. In one aspect, the second security unit 128 can be configured to determine an encryption key pair. For example, the second security unit 128 can determine a public encryption key and a private encryption key. For example, the second security unit 128 can be configured to generate the encryption key pair based on an encryption algorithm. In another aspect, the second security unit 128 can be configured to identify an encryption key pair from a list, a database, or other resource on the second device 104 or other device. In one aspect, the public encryption key can be configured for encrypting information. In another aspect, the private encryption key can be configured for decrypting information encrypted by the public encryption key. For example, the public encryption key can be mathematically related to the private encryption key.

In one aspect, the second security unit 128 can be configured to generate a certificate signing request. In one aspect, the certificate signing request can comprise an encryption key, such as a public encryption key. The certificate signing request can be a request for a signed certificate based on the encryption key. In one aspect, the certificate signing request can comprise other information, such as network identifiers, host names, affiliation identifiers, geographic information, contact information and the like. In response to the certificate signing request, the second security unit 128 can be configured to receive a signed security certificate. The signed security certificate can comprise an encryption key, such as a public encryption key. The signed security certificate can comprise information, such as a certificate identifier, an encryption algorithm identifier, time values (e.g., origination date, expiration date), a device identifier, a host name or common name, an organization name, an issuer identifier, a user identifier, one or more digital signatures, and the like. As an illustration, the second device 104 can be configured to provide a certificate signing request to the first device 102. In response, the first device 102 can be configured to provide the second device 104 a signed security certificate.

In one aspect, the second security unit 128 can be configured to generate a token. A token can comprise a set of numbers, letters, symbols, and the like. For example, the token can comprise any random or arbitrary set of numbers, letters, symbols, and the like. The second security unit 128 can be configured to use the token to facilitate the formation of a trusted relationship between two devices. For example, the second security unit 128 can be configured to use the token to facilitate the formation of a trusted relationship between the first device 102 and the third device 106. As an illustration, the second device 102 can provide the token (e.g., or a first copy of the token) to the first device 102. For example, the token can be provided to the first device 102 with the certificate signing request. The second device 104 can provide the token (e.g., a second copy of the token) to the third device 106. As an example, in response to receiving a signed certificate from the first device 102, the second device 104 can provide the token to the third device 106.

In another aspect, the second device 104 can comprise interface elements 130 configured to provide an interface with a user. For example, the interface element 130 can comprise one or more buttons, displays, lights, and the like. As an illustration, the interface elements can comprise a configuration button. For example, the configuration button can be a pairing button for pairing devices together. In response to the configuration button being pressed by a user, the second device 104 can perform one or more operations. For example, the second device 104 can be configured to determine encryption keys, to generate a certificate signing request, to provide the certificate signing request to another device, and the like. As another example, the interface elements 130 can comprise a display. The display can provide information to a user. For example, the display can provide the token to a user. The user can view the token on the display. Then, the user can provide the token to the third device 102.

As previously noted, the system 100 can comprise a third device 106. In one aspect, the third device 106 can comprise a user interface 132. The user interface 132 can be configured to receive information from a user. For example, the user interface 132 can be configured to receive user information (e.g., user name, password), a token, configuration information, and the like. In another aspect, the user interface 132 can be configured to provide content 112 to a user. For example, the user interface 132 can comprise one or more applications, such as a web browser, a mobile application, an applet, a stand alone application, and the like. As an illustration, the user interface 132 can comprise an application configured to receive content 112 from the first device 102. For example, the user interface 132 can be configured to receive content 112 based on a trusted relationship with the first device 102. For example, the trusted relationship can be based on an authenticated communication session, an encrypted communication session, the exchange of one or more certificates, an exchange of one or more encryption keys, communication through a proxy (e.g., proxy server configured on second device 104), and/or the like.

In one aspect, the third device 106 can be configured to provide the user information to one or more other devices, such as the first device 102. For example, the third device 106 can be configured to transmit the user information as one or more network packets through the second device 104 to the first device 102. In one aspect, the second device 104 can operate as a gateway for the purpose of transmitting the user information to the first device 102. For example, the communication unit 124 of the second device 104 can route the user information to the first device 104. The network packets (e.g., transmitting the user information) received by the first device 102 can comprise an origination address indicating that the network packets originated from the third device 106. In some scenarios, the second device 104 can use network address translation such that the origination address indicates the second device 104 instead of the third device 106. In response to providing the user information, the third device 106 and the first device 102 can establish a communication session.

In one aspect, the third device 106 can provide the token to the first device 102 through the communication session. For example, the user interface 132 can be configured to prompt a user for a token. The user can receive the token from the second device 104 (e.g., by pressing a button and viewing the button on a display). Then, the third device 106 can transmit the token to the first device 102 through the second device 104. For example, the third device 106 can transmit the token as one or more network packets. The communication unit 124 can receive the network packets comprising the token and route the network packets to the first device 102. When the first device 102 receives the network packets, the network packets can indicate the network packets originated from the third device 106.

In one aspect, the third device 106 can be configured to receive a host name of a proxy. In response to receiving a matching second token and first token, the first device 102 can provide the host name of a proxy to the third device 106. The proxy can be configured, for example, on the second device 104. For example, the proxy can be provided by the proxy unit 126 of the second device 104. In one aspect, the user interface 132 can be configured to connect to the proxy. For example, the user interface 132 can request content from the first device 102 through the proxy.

Figure 2:
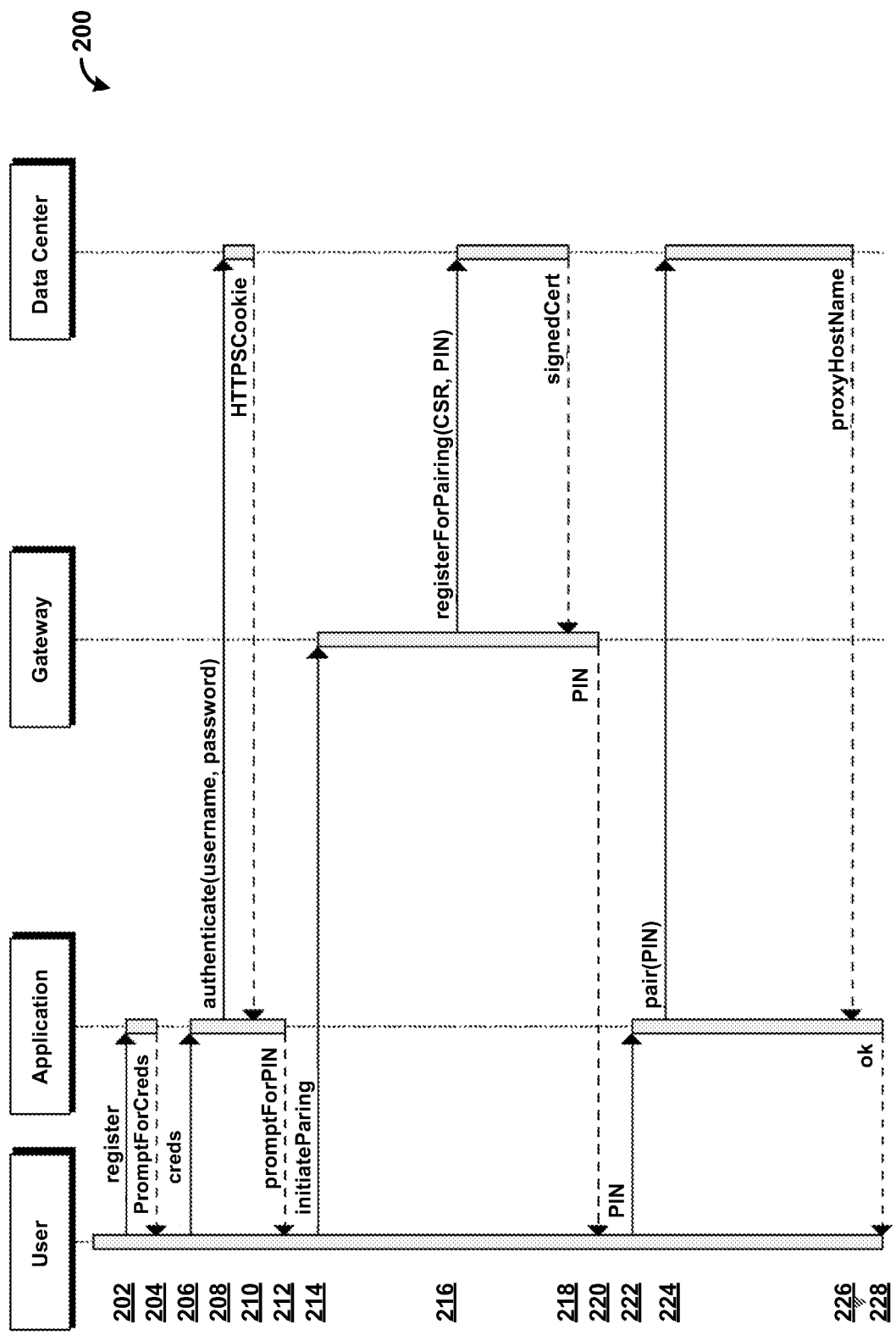
FIG. 2 is a diagram illustrating an example process for configuring a network.

FIG. 2 is a diagram illustrating an example process 200 for configuring a network. The process 200 illustrates interactions between a user, an application, a gateway (e.g., home gateway), and a data center (e.g., server). It should be noted that these devices are for convenience of illustration and that other types of devices are contemplated in various implementations. At step 202, a user can attempt to register or log in to an account at the application. At step 204, the application can prompt the user for user information (e.g., credentials such as user name and password). At step 206, the user can provide user information (e.g., credientials) to the application. At step 208, the application can provide the user information to a data center. In one aspect, the application can provide the user information through the gateway to the data center. For example, the gateway can forward network packets comprising the user information to the data center. The data center can authenticate the user information. For example, the data center can verify that the user information matches user information at the data center. At step 210, if the user information is authenticated, the data center can provide information to the application. For example, the data center can provide a HyperText Transfer Protocol Secure (HTTPS) cookie. The HTTPS cookie can facilitate a communication session (e.g., authenticated communication session) between the application and the data center. At step 212, the application can request a token from the user. For example, the application can request a PIN (personal identification number). It should be noted that even though FIG. 2 illustrates the use of a PIN, other types of tokens are contemplated. At step 214, the user can instruct the home gateway to initiate a pairing operation. For example, the user can press a button or otherwise interact with the home gateway to instruct the gateway to initiate the pairing operation. In some implementations, the application can instruct the gateway to initiate pairing without user instruction. Then, the gateway can generate a token. For example, the gateway can generate a random PIN. The gateway can also generate one or more encryption keys, such as an SSL keypair, and a certificate signing request.

At step 216, the home gateway can provide registration information to the data center for pairing the home gateway with a user and/or user device. For example, the home gateway can provide a certificate signing request and a first copy of the token to the data center. In one aspect, the certificate signing request can comprise a public encryption key. Upon receiving the registration information, the data center can associate (e.g., bind) the public encryption key with the token. The data center can generate a signed security certificate. In one aspect, the data center can determine an expiration time. For example, the expiration time can be provided in the registration information. As another example, the expiration time can be a predefined amount of time after the arrival of the registration information.

At step 218, the data center can provide the signed security certificate to the home gateway. At step 220, the home gateway can provide a second copy of the token to the user. For example, the home gateway can display the token on a display element of the home gateway. As another example, the home gateway can transmit the token to the application. At step 222, the user can provide the token to the application. At step 224, the application can provide the second copy (e.g., or a copy thereof based on user input) of the token to the data center. The data center can verify that the first copy of the token matches the second copy of the token. The data center can identify the public encryption key based on the second copy of the token matching the first copy of the token. The data center can associate (e.g., bind) the user providing the second copy of the token with public encryption key. The data center can create a domain name system (DNS) entry associating a host name of a proxy with the gateway. At step 226, if the first copy of the token matches the second copy of the token, then the data center can provide the host name of a proxy to the application. The application can use the host name to connect to a proxy at the home gateway. At step 228, the application can indicate to the user that the configuration process (e.g., pairing operation is complete). The application can then be used to access content at the data center or other device through the proxy.

Figure 3:
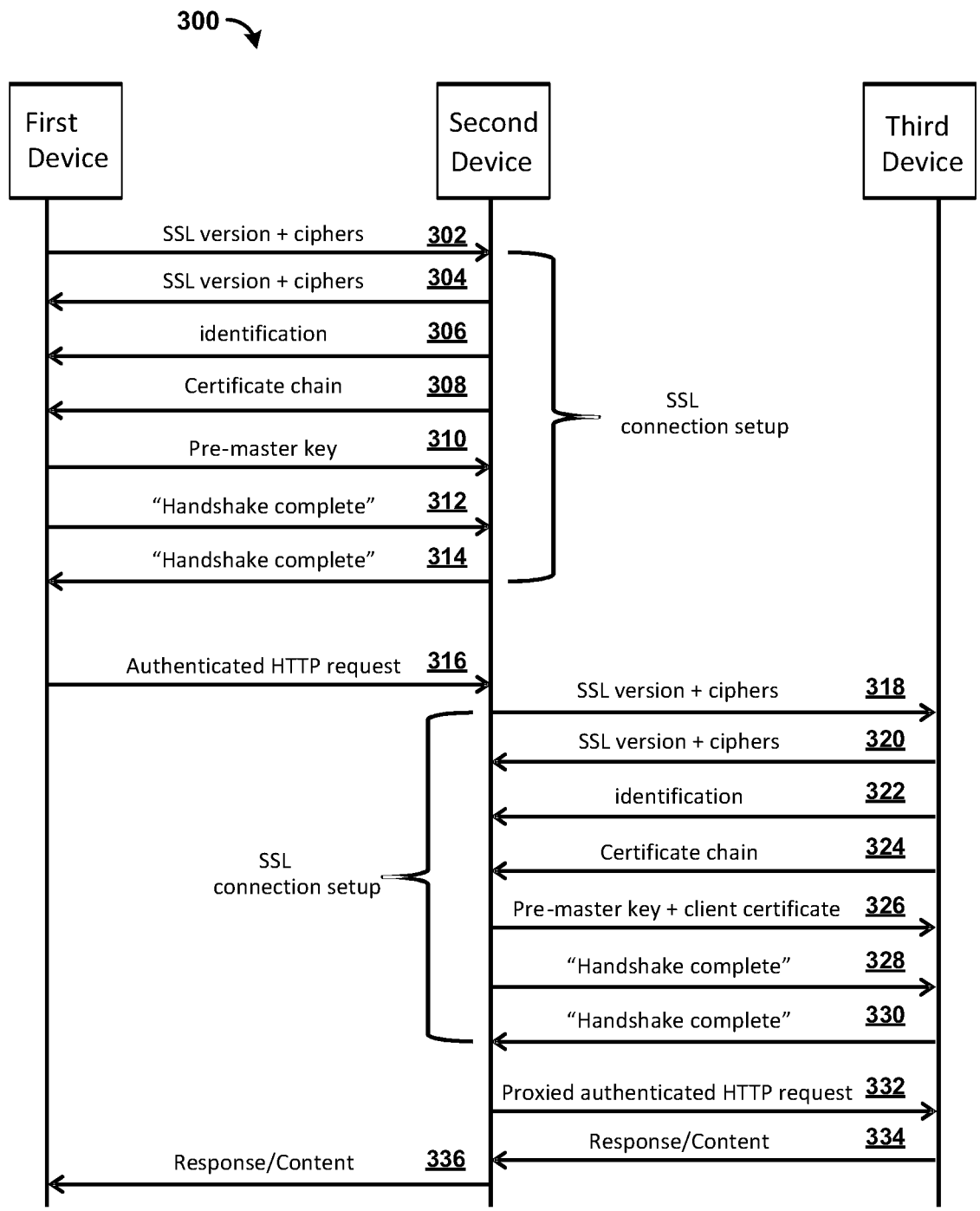
FIG. 3 is a diagram illustrating another example process for configuring a network.

FIG. 3 is a diagram illustrating an example process 300 for configuring a network. The network can comprise a first device, second device, and a third device. As an illustration, the first device can be a user device. The second device can comprise a gateway, a router, a modem, a proxy, or other similar network device. The third device can comprise a content device, such as a server.

At step 302, a first device can provide encryption information to a second device. The encryption information can comprise, for example, encryption algorithm version information (e.g., Secure Sockets Layer, Transport Layer Security), cipher information, and the like. At step 304, the second device can provide encryption information to the first device. For example, the second device can respond with a selected encryption algorithm, ciphers, and the like. At step 306, the second device can provide identification to the first device. For example, the identification can be a network identifier or host name. At step 308, the second device can provide a certificate chain to the first device. For example, a certificate chain can comprise a sequence of signed certificates that allows the receiving device to establish an unbroken line of trust. As a further example, the certificate chain can comprise digital signatures from an intermediate certificate authority and top-level certificate authority. As an illustration, a public certificate can be accompanied by two digital signatures, one from an intermediate certificate authority (e.g., verifying the public certificate) and one from a top-level certificate authority (e.g., verifying the intermediate certificate authority). The first device can validate that the certificate was signed by the third device and matches a proxy host name. At step 310, the first device can provide a pre-master key to the second device. At step 312, the first device can provide an instruction to the second device that an initialization process is complete. For example, the first device can indicate that a handshake is complete. At step 314, the second device can send an acknowledgment that the initialization process is complete. For example, the second device can indicate that the handshake is complete. At step 316, the first device can provide a request for content based on an authenticated communication session. For example, the request can be based on an authenticated HyperText Markup Protocol (HTTP) communication session.

At step 318, the second device can provide an encryption version (e.g., SSL version) and a list of known ciphers to the third device. At step 320, the third device can provide an encryption version (e.g., SSL version) and ciphers. At step 322, the third device can provide identification information to the second device. For example, the identification information can comprise a network identifier, a host name, or the like. At step 324, the third device can provide a certificate chain to the second device. At step 326, the second device can provide a pre-master key and a client certificate to the third device. The third device can determine the proxy's identity based on the client certificate. At step 328, the second device can provide an instruction that the security handshake is complete. At step 330, the third device can provide an acknowledgment that the security handshake is complete. At step 332, the second device can provide an authenticated HTTP request to the third device. In one aspect, the second device can provide the authenticated HTTP request to the third device through a proxy service (e.g., proxy server) configured on the second device. In one aspect, the authenticated HTTP request can comprise a request for content. In another aspect, the third device can determine a user requesting content based on the authenticated HTTP request. For example, the third device can receive an HTTPS cookie identifying at least one of a user and or an authenticated communication session based on verified user information. The third device can also determine the identity (e.g., and an assumption of location) of the second device via the client certificate presented in step 326. At step 334, the third device can provide a response to the proxy service on the second device. For example, the third device can provide the requested content. At step 336, the second device can provide the response from the third device to the first device.

Figure 4:
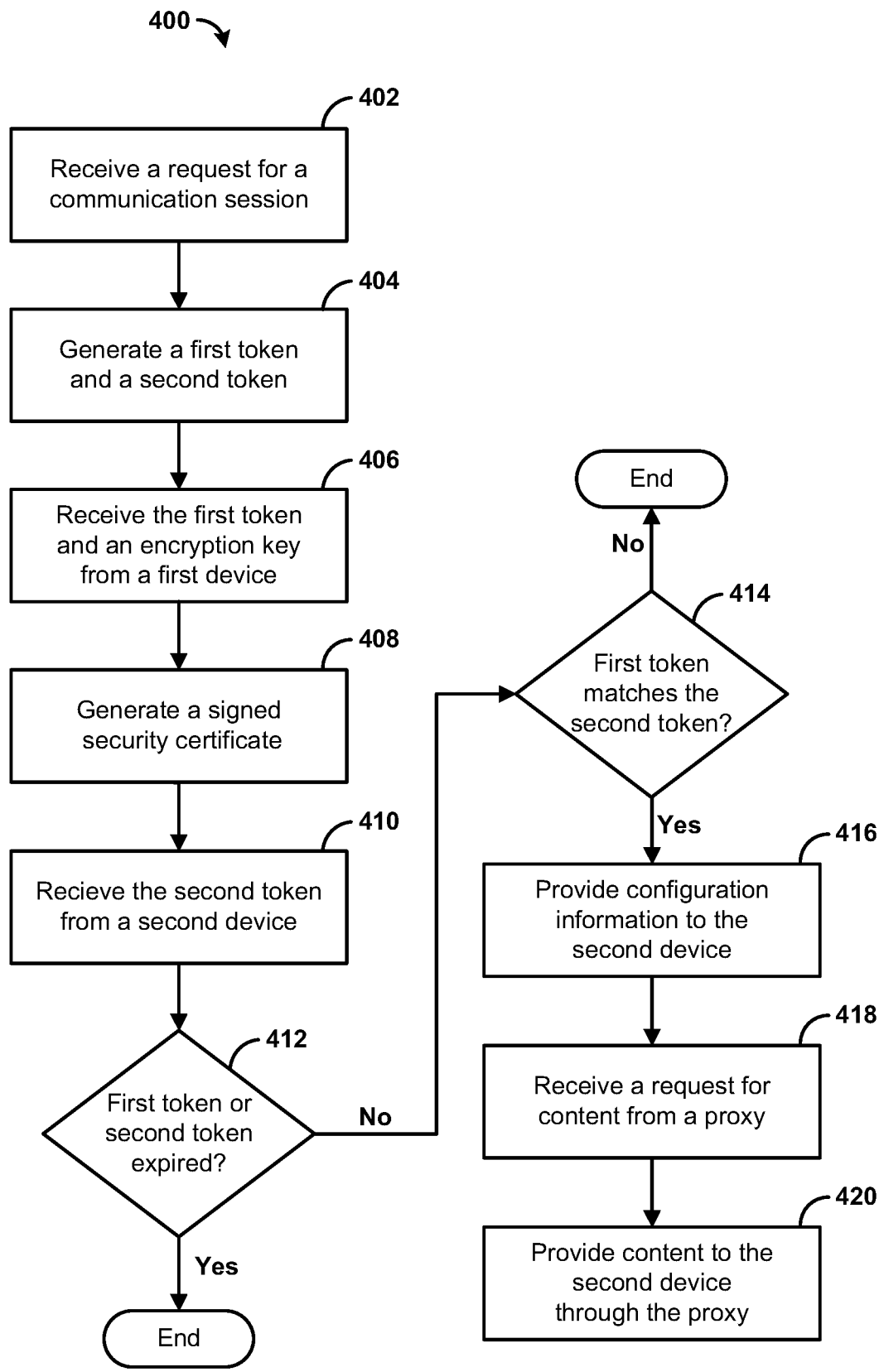
FIG. 4 is a flowchart illustrating an example method for configuring a network.

FIG. 4 is a flowchart illustrating an example method 400 for configuring a network. The network can comprise a first device and a second device. In one scenario, the first device and the second device can be located in a local area network. For example, the first device can be configured as a gateway for a first application on the second device. As another example, the first device can be configured as the proxy for a second application on the second device. As a further example, the first device can be configured as both a proxy and a gateway for the first application and/or the second application. In one aspect, the second device can be a user device, such as a mobile phone, a smart device (e.g., smart phone, smart glasses, smart watch), a computer station, a laptop device, a tablet computer, a television, a digital streaming device, and the like.

At step 402, a request for a communication session can be received from the second device. For example, the request can comprise user information, such as a user name and password. In one aspect, the communication session can be an authenticated communication based on the user information matching stored user information.

At step 404, a first token and second token can be generated at the first device. For example, the first token and second token can be generated after receiving a request to pair the second device with the first device. In one aspect, the request to pair the second device with the first device can be received from a user. For example, the user can press a button (e.g., pairing button) on the first device. As another example, the second device can send an instruction to the first device to generate one or more tokens. In one aspect, a token can comprise a set of numbers, letters, symbols, and the like. For example, the token can comprise any random or arbitrary set of numbers, letters, symbols, and the like. In one aspect, the first device can generate a token, and the first token can be a first copy of the token and the second token can be a second copy of the token.

At step 406, a first token and an encryption key can be received from the first device. In one aspect, the encryption key can comprise a public encryption key. For example, the first device can determine (e.g., identify, generate) a pair of encryption keys. The pair of encryption keys can comprise a public encryption key and a private encryption key. The private encryption key can be configured to unencrypt the information encrypted using the public encryption key. In one aspect, the first token can be received from the first device with (e.g., or as part of) a request for the signed security certificate. For example, the request for the signed security certificate can comprise the encryption key.

At step 408, a signed security certificate can be generated. For example, an encryption key can be digitally signed with another encryption key. As an illustration, a private encryption key can be used to sign a public encryption key received by the first device. The public encryption key and the private encryption key can be included in the signed security certificate.

At step 410, a second token can be received from a second device. For example, the first device can provide the second token to the second device. As another example, the first device can provide the second token to user, and the user can provide the token to the second device. The second device can then provide the second token.

At step 412, it can be determined if at least one of the first token and the second token is expired. For example, at least one of the first token and the second token can be configured to expire after a specified time period. In one aspect, the first token and/or second token can comprise information indicating an expiration date. As a further example, the first token can be received at a first time and the second token can be received at a second time. An expiration time can be associated with the first token based on the first time. For example, the expiration time can be a predetermined time after the first time. If the second time is after the expiration time, then it can be determined that the first token and/or second token is expired. If the first token and/or the second token is expired, the method 400 can end. If the first token and/or the second token is determined to not be expired, then the method 400 can proceed to step 414.

At step 414, it can be determined if the first token matches the second token. For example, the first token can be compared to the second token. If the first token is equal to or otherwise equivalent to the second token, then the first token can be determined to match the second token. If the first token does not match the second token, then the method 400 can end. If the first token is determined to match the second token, then the method 400 can proceed to step 416.

At step 416, configuration information can be provided to the second device. In one aspect, the configuration information can comprise information for connecting to a proxy configured on the first device. For example, the configuration information can comprise a host name of the proxy. The host name can allow devices to locate and/or communicate with the proxy. In one aspect, the proxy can be a proxy server or other service on the first device. The proxy can be configured to receive network packets from the second device. The proxy can be configured to modify the network packets such that information indicating that the second device originated the network packets is removed from the network packets.

At step 418, a request for content can be received from the proxy on behalf of the second device. In one aspect, the request for content can comprise the encryption key. In another aspect, the request for content can be based on the communication session. For example, the request can be provided through the communication session. As a further example, the request can be provided with an HTTPS cookie or other HTTP based information.

At step 420, content can be provided to the second device. For example, content can be provided through the proxy on the first device. The content can be provided based on a Hypertext Transfer Protocol Secure connection. In one aspect, the content can comprise streaming media, such as streaming audio, streaming video, and the like. The content can also comprise other audio, video, images, text, files, electronic messages, and the like.

Figure 5:
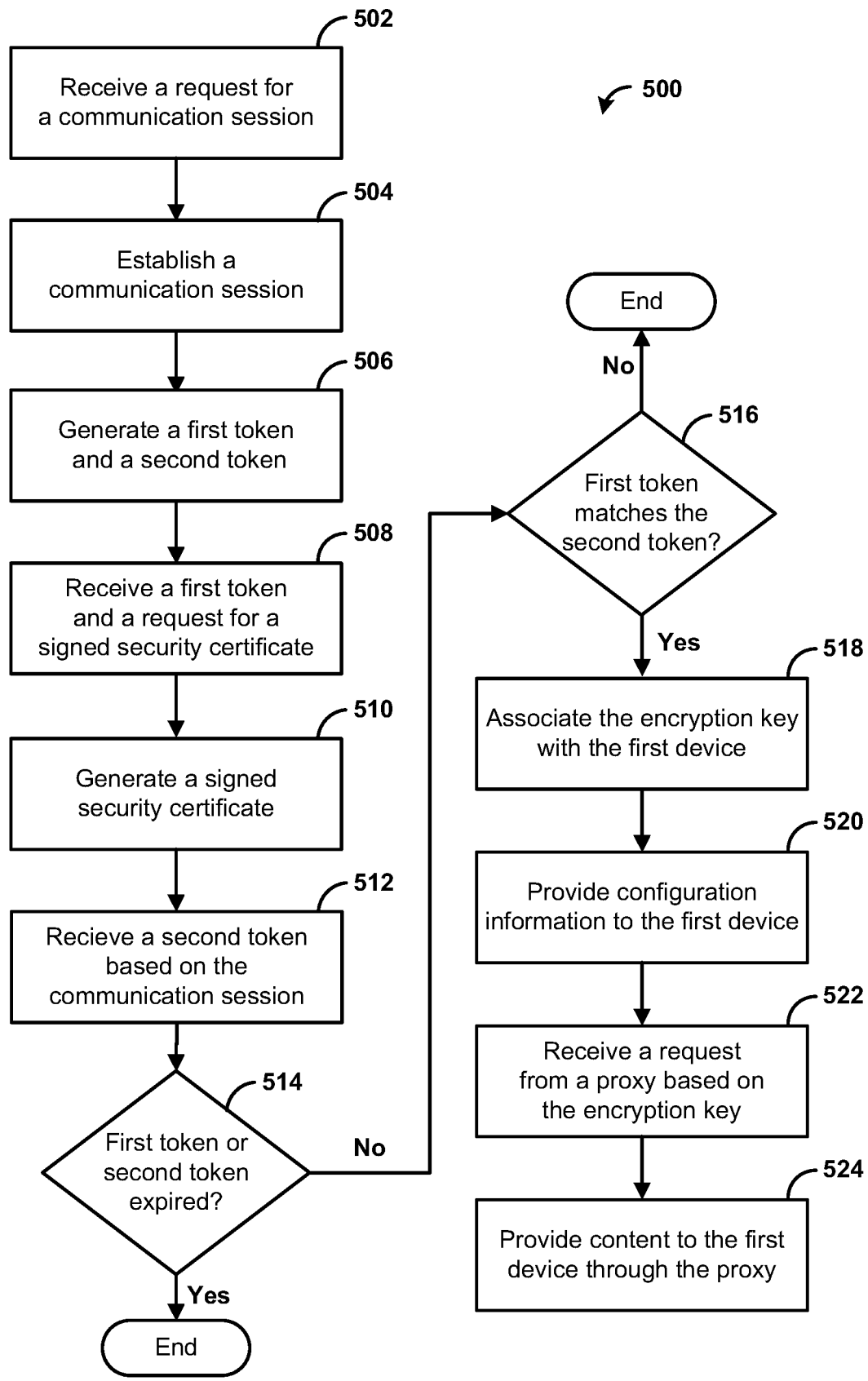
FIG. 5 is a flowchart illustrating another example method for configuring a network.

FIG. 5 is a flowchart illustrating another example method 500 for configuring a network. In one aspect, the network can comprise a first device and a second device. The first device and the second device can be located in a local area network. In one aspect, the second device can be configured as a gateway for a first application on the first device. In another aspect, the second device can be configured as a proxy for a second application on the first device. As a further example, the second device can be configured as both a proxy and a gateway for the first application and/or the second application. In one aspect, the first device can be a user device, such as a mobile phone, a smart device (e.g., smart phone, smart glasses, smart watch), a computer station, a laptop device, a tablet computer, a television, a digital stream device, and the like.

At step 502, a request for a communication session can be received. For example, the request can be received from the first device. For example, the request can be for an authenticated communication session.

At step 504, a communication session can be established. For example, the communication session can be established with the first device. As a further example, the communication session can be established based on user information provided to and/or provided by the first device. The communication session can be established based on the user information provided to and/or provided by the first device matching stored user information. For example, the user information can be received by the first device from a user, and the first device can provide the user information.

At step 506, a first token and a second token can be generated at the second device. In one aspect, the first token and second token can be generated after the second device receives a request to pair the second device with the first device. For example, the first token and second token can be generated after receiving a request to pair the second device with the first device. In one aspect, the request to pair the second device with the first device can be received from a user. For example, the user can press a button (e.g., pairing button) on the second device. As another example, the first device can send an instruction to the second device to generate one or more tokens. In one aspect, a token can comprise a set of numbers, letters, symbols, and the like. For example, a token can comprise any random or arbitrary set of numbers, letters, symbols, and the like. In one aspect, the second device can generate a token, and the first token can be a first copy of the token and the second token can be a second copy of the token.

At step 508, a first token and a request for a signed security certificate can be received from the second device. The request for the signed security certificate can comprise an encryption key. In one aspect, the encryption key can comprise a public encryption key. For example, the second device can determine (e.g., identify, generate) a pair of encryption keys. The pair of encryption keys can comprise a public encryption key and a private encryption key. The private encryption key can be configured to unencrypt the information encrypted using the public encryption key.

At step 510, a signed security certificate can be generated. For example, an encryption key can be digitally signed with another encryption key. As an illustration, a private encryption key can be used to sign a public encryption key received by the second device. The public encryption key and the private encryption key can be included in the signed security certificate.

At step 512, a second token can be received from the first device based on the communication session. For example, the second token can be provided through the communication session. As a further example, the second token can be provided based on an HTTPS connection. For example, the second token can be provided with an HTTPS cookie or other HTTP related information.

At step 514, it can be determined if at least one of the first token and the second token is expired. For example, at least one of the first token and the second token can expire after a specified time period. In one aspect, the first token and/or second token can comprise information indicating an expiration date. As a further example, the first token can be received at a first time and the second token can be received at a second time. An expiration time can be associated with the first token based on the first time. For example, the expiration time can be a predetermined time after the first time. If the second time is after the expiration time, then it can be determined that the first token and/or second token is expired. If the first token and/or the second token is expired, the method 500 can end. If the first token and/or the second token is determined to not be expired, then the method 500 can proceed to step 516.

At step 516, it can be determined if the second token matches the first token. If the first token is equal to or otherwise equivalent to the second token, then the first token can be determined to match the second token. If the first token does not match the second token, then the method 500 can end. If the first token is determined to match the second token, then the method 500 can proceed to step 518.

At step 518, the encryption key can be associated with the first device and/or a user at the first device. For example, the encryption key can be associated with the second device (e.g., because the encryption key was received in the request for the signed certificate). Since the first token received from the first device matches the second token received from the second device, the encryption key associated with the second device can be associated with the first device and/or a user at the first device.

At step 520, configuration information can be provided to the first device for connecting to a proxy on the second device. For example, the configuration information can comprise a host name of the proxy. The host name can allow devices to locate and/or communicate with the proxy. In one aspect, the proxy can be a proxy server or other service on the second device. The proxy can be configured to receive network packets from the first device. The proxy can be configured to modify the network packets such that information indicating that the first device originated the network packets is removed from the network packets. In one aspect, providing the configuration information to the first device can be provided with the signed security certificate.

At step 522, a request for content can be received from the proxy. The request for content can be based on the encryption key. In one aspect, the request for content can be based on the communication session. For example, the second device can receive the request for content from the first device. In one aspect, the encryption key can be provided from the proxy with the request for content. In one aspect, the content can comprise streaming media, such as streaming audio, streaming video, and the like. The content can also comprise other audio, video, images, text, files, electronic messages, and the like.

At step 524, content can be provided to the first device through the proxy on the second device. For example, the content can be provided to the first device based on a Hypertext Transfer Protocol Secure connection. The HTTPS connection can be a network connection between the first device and a device providing the content.

Figure 6:
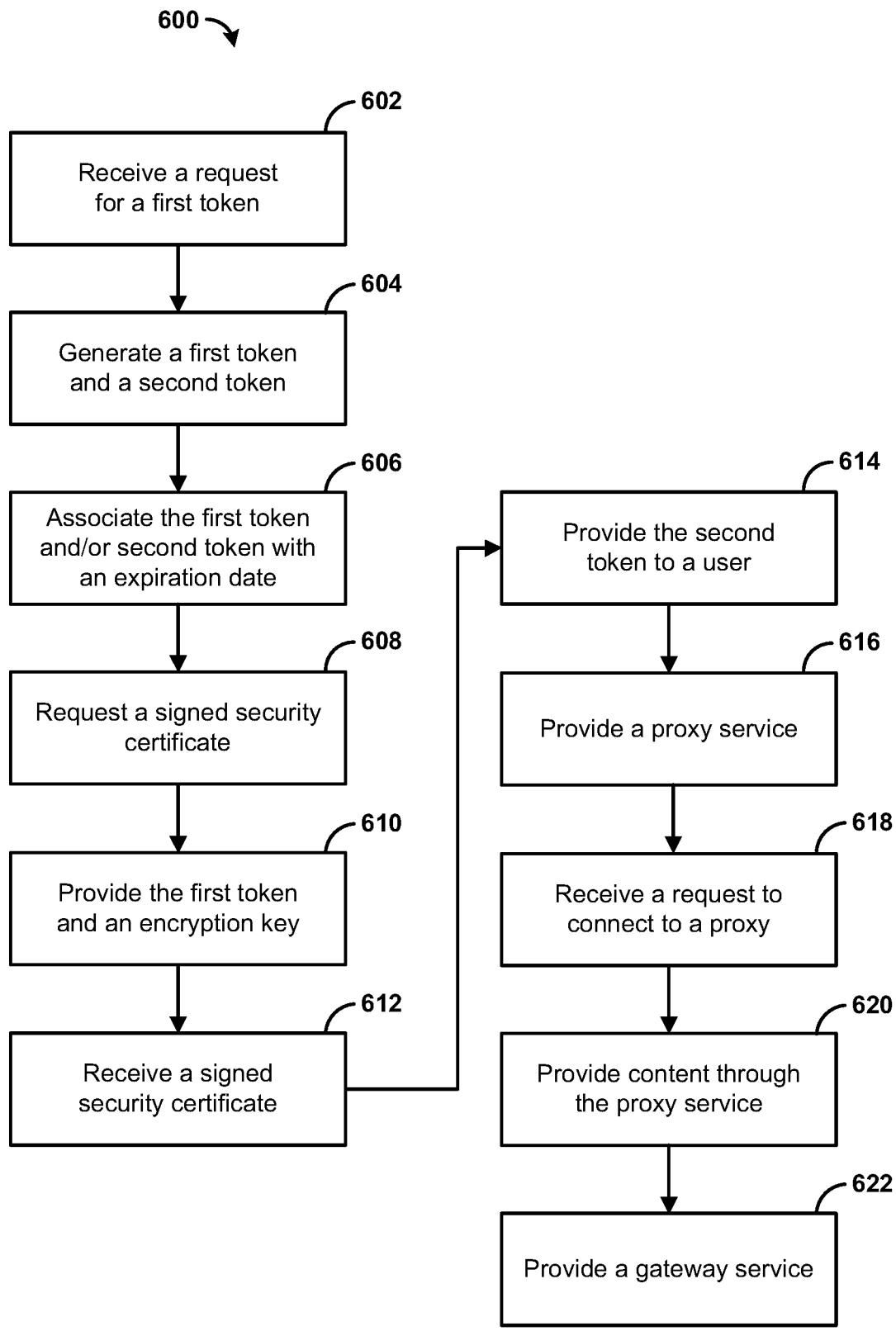
FIG. 6 is a flowchart illustrating yet another example method for configuring a network.

FIG. 6 is a flowchart illustrating yet another example method 600 for configuring a network. In one aspect, the network can comprise a first device, a second device, and a third device. In one aspect, the method 600 can be performed by one or more of the first device, second device, and the third device. As an example, the method 600 can be performed by the third device. The second device and the third device can be located in a local area network. The first device can be located in a remote network (e.g., a wide area network, content distribution network, content access network, the Internet). The first device can be accessible to the third device through the remote network. As an illustration, the third device can be configured as a gateway and/or a proxy. In one aspect, the second device can be a user device, such as a mobile phone, a smart device (e.g., smart phone, smart glasses, smart watch), a computer station, a laptop device, a tablet computer, a television, a digital streaming device, and the like.

At step 602, a request can be received for a token. For example, the request can be based on a request to pair with a device (e.g., the second device). In one aspect, the request to pair with the device can be received from a user. For example, the user can press a button (e.g., pairing button). As another example, the second device can send an instruction to generate one or more tokens.

At step 604, a first token and a second token can be generated (e.g., by the third device). For example, the first token and second token can be generated after receiving the request to pair with a device (e.g., the second device). In one aspect, a token can comprise a set of numbers, letters, symbols, and the like. For example, a token can comprise any random or arbitrary set of numbers, letters, symbols, and the like. In one aspect, a token can be generated. The first token can be a first copy of the token, and the second token can be a second copy of the token.

At step 606, at least one of the first token and the second token can be associated with an expiration date. For example, at least one of the first token and the second token can expire after the expiration period. For example, the first token and/or the second token can comprise information indicating an expiration date. The information can be inserted, appended, or otherwise added to the first token and/or the second token. In another aspect, the information indicating an expiration date can be generated when the first token and/or second token is generated. As a further example, the first token can be provided to a first device at a first time and the second token can be provided to the first device (e.g., through the second device) at a second time. An expiration time at the first device can be associated with the first token based on the first time. For example, the expiration time can be a predetermined time after the first time.

At step 608, a signed security certificate can be requested (e.g., by the third device). For example, the first token can be provided to the first device with the request for the signed security certificate.

At step 610, the first token and the encryption key can be provided. For example, the first token and the encryption key can be provided to the first device. In one aspect, the first token and the encryption key can be provided with the request for the signed security certificate. For example, the request for the signed security certificate can comprise the encryption key. In one aspect, the encryption key can comprise a public encryption key. For example, a pair of encryption keys can be determined (e.g., identified, generated). The pair of encryption keys can comprise a public encryption key and a private encryption key. The private encryption key can be configured to unencrypt the information encrypted using the public encryption key. In one scenario, step 610 can be performed with step 608.

At step 612, a signed security certificate based on the encryption key can be received from the first device. For example, the signed security certificate can comprise the encryption key. The signed security certificate can comprise another encryption key, such as a public encryption key associated with the first device.

At step 614, the second token can be provided to a user. For example, the second token can be provided to the user through a user interface, such as a display (e.g., light emitting diode display, liquid crystal display). As another example, the second token can be provided to a device associated with (e.g., operated by, accessible to) a user. As an illustration, the second token can be provided to the second device. In one aspect, providing the second token to the user can comprise providing the second token to a device (e.g., the second device) associated with the user regardless of whether the device associated with the user communicates the second token to the user.

At step 616, a proxy service can be provided. For example, the proxy service can be provided to the second device. As a further example, the proxy service can be accessed by the second device based on a host name. The host name can allow devices to locate and/or communicate with the proxy. In one aspect, the proxy can be a proxy server or other similar service. The proxy can be configured to receive network packets from the second device. The proxy can be configured to modify the network packets such that information indicating the second device originated the network packets is removed from the network packets.

In one aspect, the proxy service can be provided to the second device based on the signed security certificate. For example, network packets received from the second device can be provided to the first device with the signed security certificate.

At step 618, a request to connect to a proxy (e.g., the proxy service) can be received. For example, the request can be received from the second device. In one aspect, the request can be based on the second token matching the first token. For example, the first device can receive the first token and the second token. The first device can determine if the first token matches the second token. If the first token matches the second token, then the first device can provide configuration information to the second device. In one aspect, the configuration information can comprise information for connecting to the proxy. For example, the configuration information can comprise a host name of the proxy. If the first token does not match the second token or if the first token and/or second token is otherwise deemed as expired, then the method 600 can end.

At step 620, content can be provided from the first device to the second device through the proxy service based on a Hypertext Transfer Protocol Secure connection between the first device and second device. For example, the proxy service can be provided for a first application on the second device. In one aspect, the content can comprise streaming media, such as streaming audio, streaming video, and the like. The content can also comprise other audio, video, images, text, files, electronic messages, and the like.

At step 622, a gateway service can be provided for a second application on the second device. In one aspect, an authenticated communication session can be facilitated between the first device and the second device for the first application based on the gateway service. In another aspect, the gateway service can be provided to the first application on the second device. For example, the second device can provide user information to the first device through the gateway service. The second device can also receive the configuration information from the first device through the gateway service.

Figure 7:
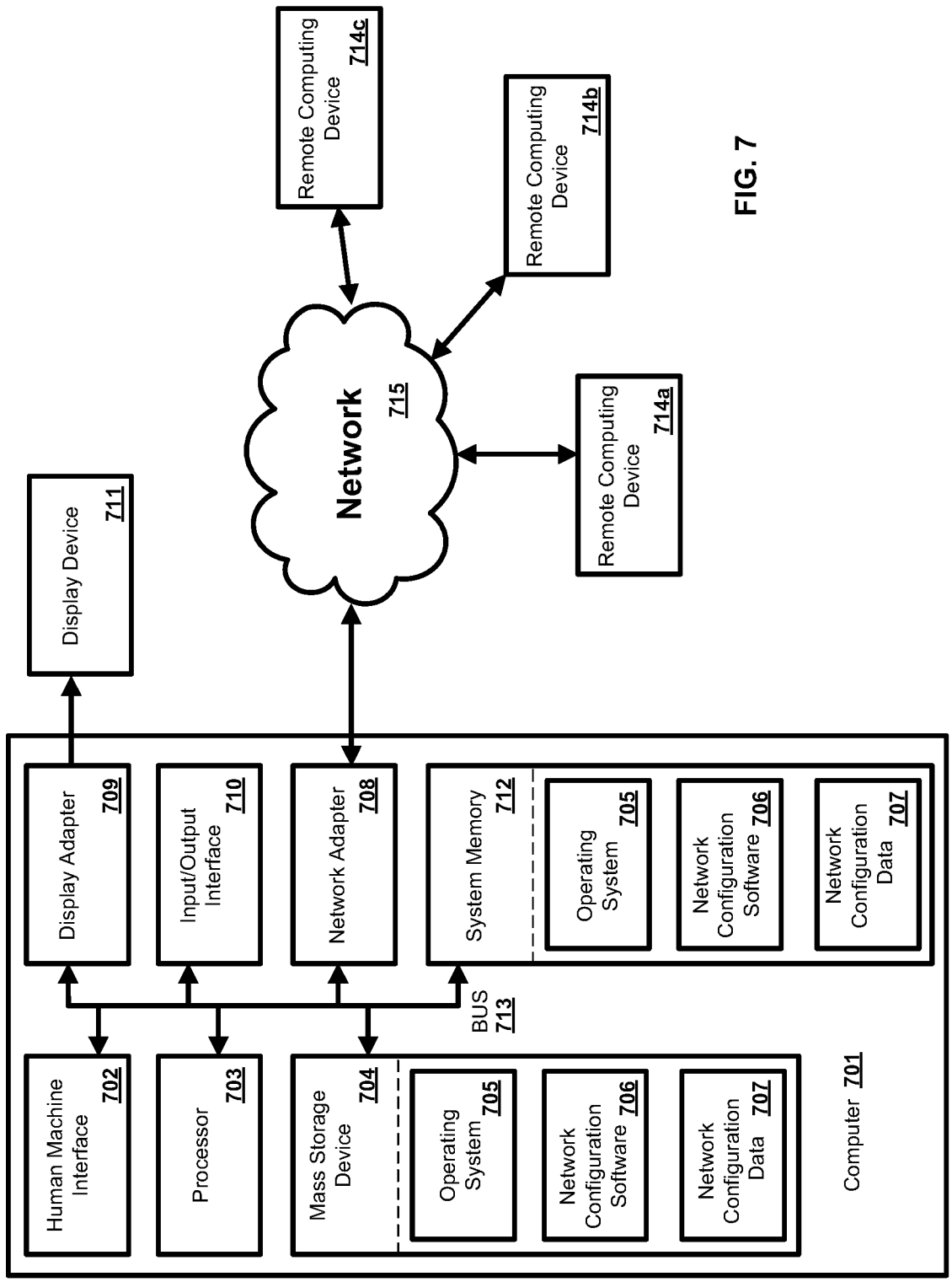
FIG. 7 is a block diagram illustrating an example computing system in which the present methods and systems can operate.

In an exemplary aspect, the methods and systems can be implemented on a computer 701 as illustrated in FIG. 7 and described below. By way of example, the first device 102, second device 104, and/or third device 106 of FIG. 1 can be a computer as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703 or processing units, a system memory 712, and a system bus 713 that couples various system components including the processor 703 to the system memory 712. In the case of multiple processors 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, network configuration software 706, network configuration data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as network configuration data 707 and/or program modules such as operating system 705 and network configuration software 706 that are immediately accessible to and/or are presently operated on by the one or more processors 703.

In another aspect, the computer 701 can also comprise other removable/non-removable, volatile/non-volatile computer storage media. By way of example, FIG. 7 illustrates a mass storage device 704 that can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and network configuration software 706. Each of the operating system 705 and network configuration software 706 (or some combination thereof) can comprise elements of the programming and the network configuration software 706. Network configuration data 707 can also be stored on the mass storage device 704. Network configuration data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of network configuration software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

receiving, by a gateway device from a user device, an encryption key and a request for content, wherein the encryption key indicates that the user device is associated with the gateway device, and wherein the content is associated with a requirement;

modifying the request for the content to indicate that the request for the content originated from the gateway device;

sending, to a content server, the encryption key and the modified request for the content;

receiving, based on the encryption key and based on the gateway device satisfying the requirement, the requested content; and sending, to the user device, the requested content.

2. The method of claim 1, wherein the requirement comprises a geographic requirement that prevents the content from being received if the geographic requirement is not satisfied, and wherein satisfaction of the geographic requirement comprises the gateway device being located at a known location.

3. The method of claim 1, wherein the gateway device is configured as a proxy for the user device.

4. The method of claim 1, further comprising:

receiving, from the user device, a pairing request;

sending, to the content server based on the pairing request, a certificate signing request and a first token; and sending, to the user device, a second token, wherein the second token facilitates the gateway device communicating as a proxy for the user device.

5. The method of claim 4, wherein the encryption key comprises a public encryption key, and wherein at least one of the first token or the second token is configured to expire after a time period.

6. The method of claim 1, further comprising receiving, from the user device, a communication session request comprising authentication information for a user associated with the user device.

7. The method of claim 1, further comprising receiving the encryption key and the request for the content from an application associated with the user device.

8. An apparatus comprising:

one or more processors; and memory storing processor executable instructions that, when executed by the one or more processors, cause the apparatus to:

receive, from a user device, an encryption key and a request for content, wherein the encryption key indicates that the user device is associated with the apparatus, and wherein the content is associated with a requirement;

modify the request for the content to indicate that the request for the content originated from the apparatus;

send, to a content server, the encryption key and the modified request for the content;

receive, based on the encryption key and based on the apparatus satisfying the requirement, the requested content; and send, to the user device, the requested content.

9. The apparatus of claim 8, wherein the requirement comprises a geographic requirement that prevents the content from being received if the geographic requirement is not satisfied, and wherein satisfaction of the geographic requirement comprises the apparatus being located at a known location.

10. The apparatus of claim 8, wherein the apparatus is configured as a proxy for the user device.

11. The apparatus of claim 8, wherein the processor executable instructions, when executed by the one or more processors, further cause the apparatus to:

receive, from the user device, a pairing request;

send, to the content server based on receiving the pairing request, a certificate signing request and a first token; and send, to the user device, a second token, wherein the second token facilitates the apparatus communicating as a proxy for the user device.

12. The apparatus of claim 11, wherein the encryption key comprises a public encryption key, and wherein at least one of the first token or the second token is configured to expire after a time period.

13. The apparatus of claim 8, wherein the processor executable instructions, when executed by the one or more processors, further cause the apparatus to receive, from the user device, a communication session request comprising authentication information for a user associated with the user device.

14. The apparatus of claim 8, wherein the processor executable instructions, when executed by the one or more processors, further cause the apparatus to receive the encryption key and the request for the content from an application associated with the user device.

15. One or more non-transitory computer readable media storing processor executable instructions that, when executed by at least one processor, cause the at least one processor to:

receive, from a user device, an encryption key and a request for content, wherein the encryption key indicates that the user device is associated with a gateway device, and wherein the content is associated with a requirement;

modify the request for the content to indicate that the request for the content originated from the gateway device;

send, to a content server, the encryption key and the modified request for the content;

receive, based on the encryption key and based on the gateway device satisfying the requirement, the requested content; and send, to the user device, the requested content.

16. The one or more non-transitory computer readable media of claim 15, wherein the requirement comprises a geographic requirement that prevents the content from being received if the geographic requirement is not satisfied, and wherein satisfaction of the geographic requirement comprises the gateway device being located at a known location.

17. The one or more non-transitory computer readable media of claim 15, wherein the gateway device is configured as a proxy for the user device.

18. The one or more non-transitory computer readable media of claim 15, wherein the processor executable instructions, when executed by the at least one processor, further cause the at least one processor to:

receive, from the user device, a pairing request;

send, to the content server based on receiving the pairing request, a certificate signing request and a first token; and send, to the user device, a second token, wherein the second token facilitates the gateway device communicating as a proxy for the user device.

19. The one or more non-transitory computer readable media of claim 15, wherein the processor executable instructions, when executed by the at least one processor, further cause the at least one processor to receive, from the user device, a communication session request comprising authentication information for a user associated with the user device.

20. The one or more non-transitory computer readable media of claim 15, wherein the processor executable instructions, when executed by the at least one processor, further cause receiving the encryption key and the request for the content from an application associated with the user device.

* * * * *